June 4, 1957   G. A. ANDERSON   2,794,562
FUEL ELEMENT LOADING APPARATUS FOR NEUTRONIC REACTORS
Original Filed Nov. 6, 1950   3 Sheets-Sheet 1
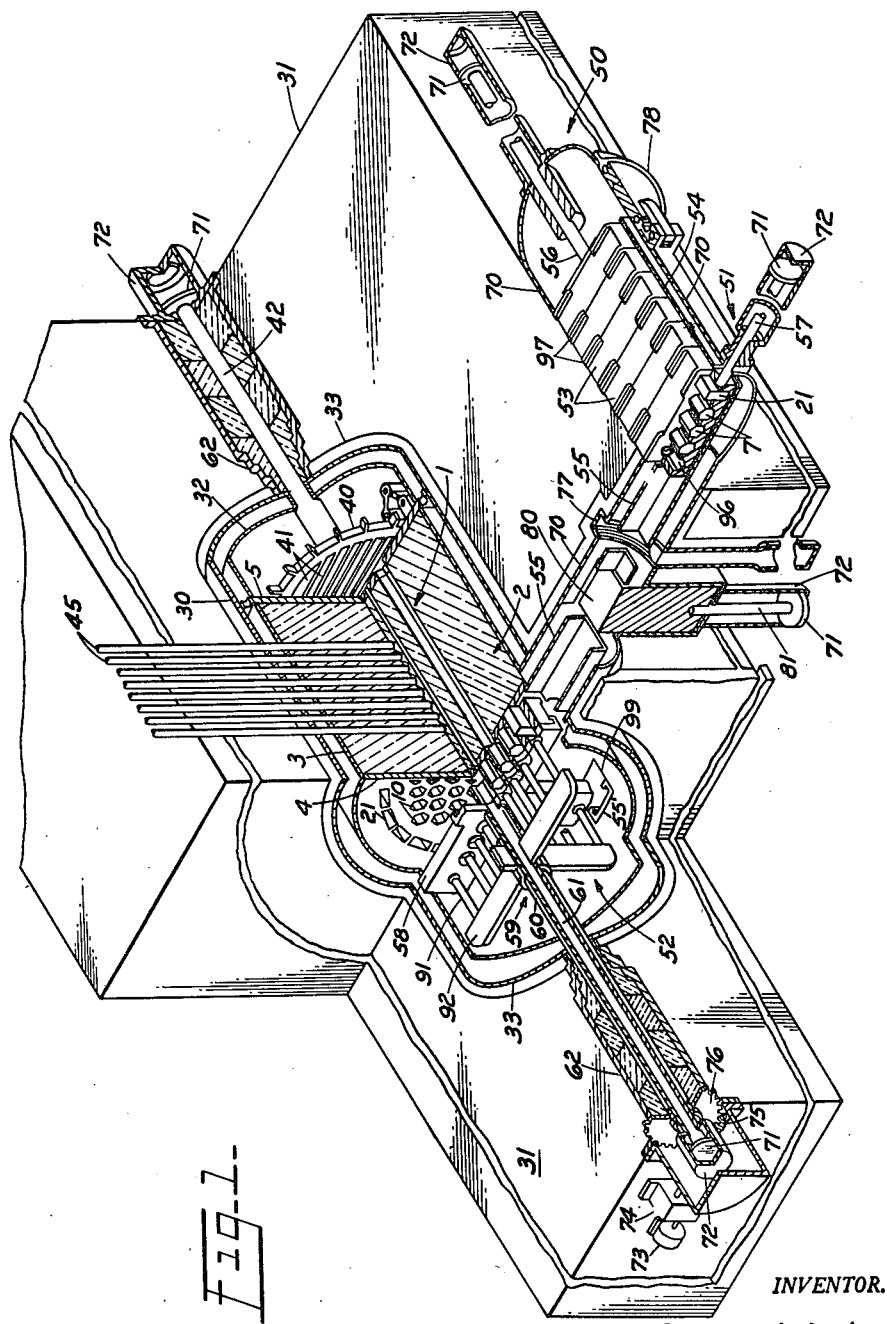
INVENTOR.
BY George A. Anderson
Roland A. Anderson
ATTORNEY

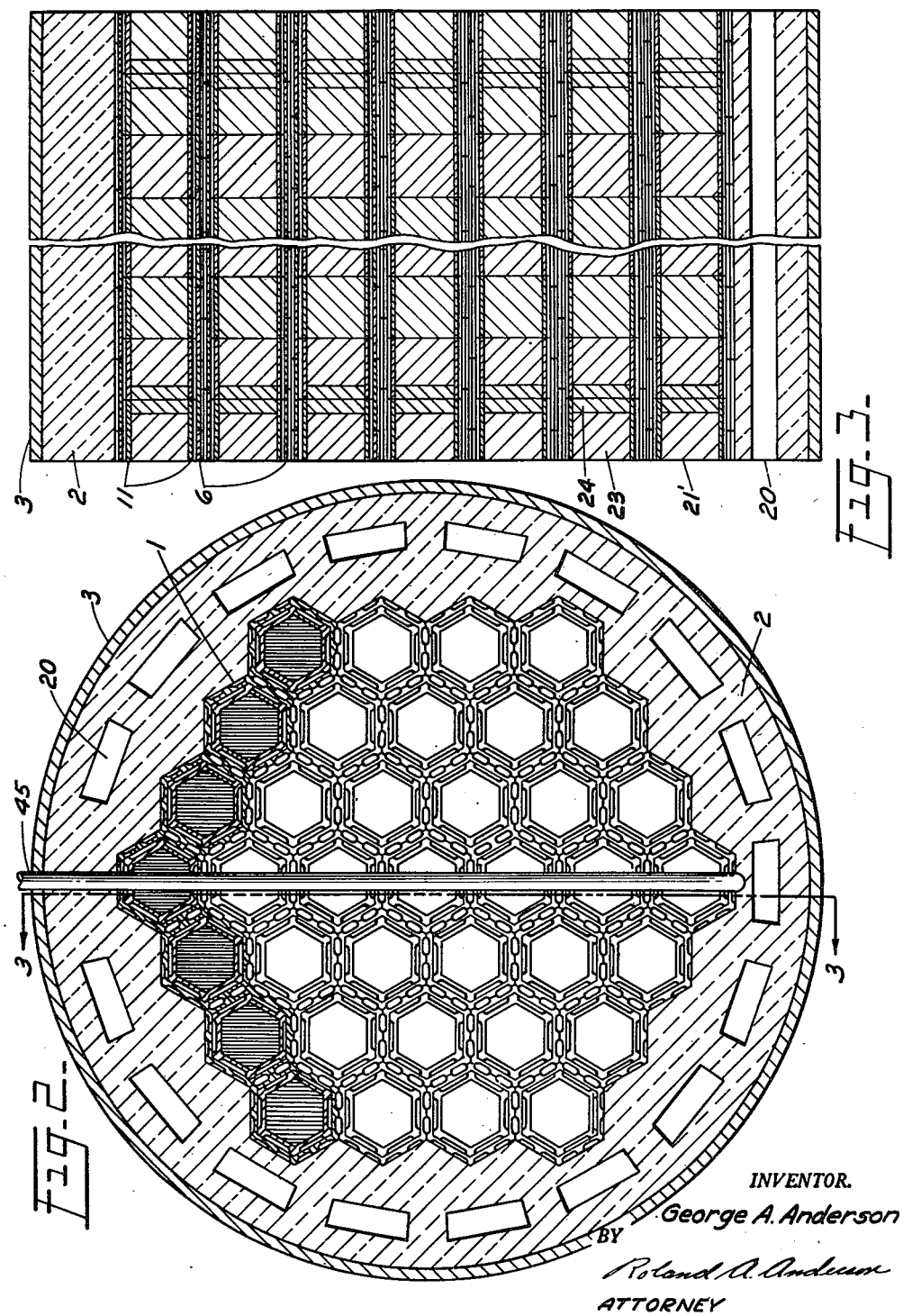

June 4, 1957 G. A. ANDERSON 2,794,562
FUEL ELEMENT LOADING APPARATUS FOR NEUTRONIC REACTORS
Original Filed Nov. 6, 1950 3 Sheets-Sheet 3
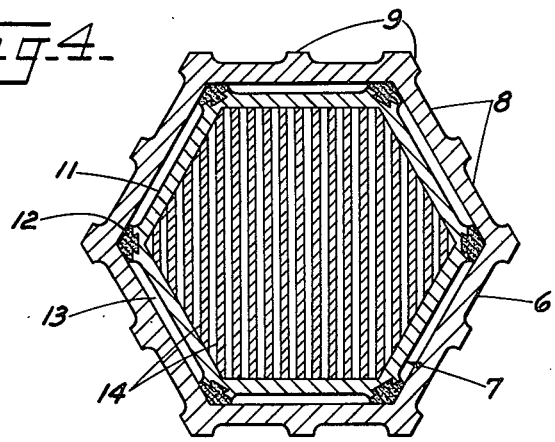
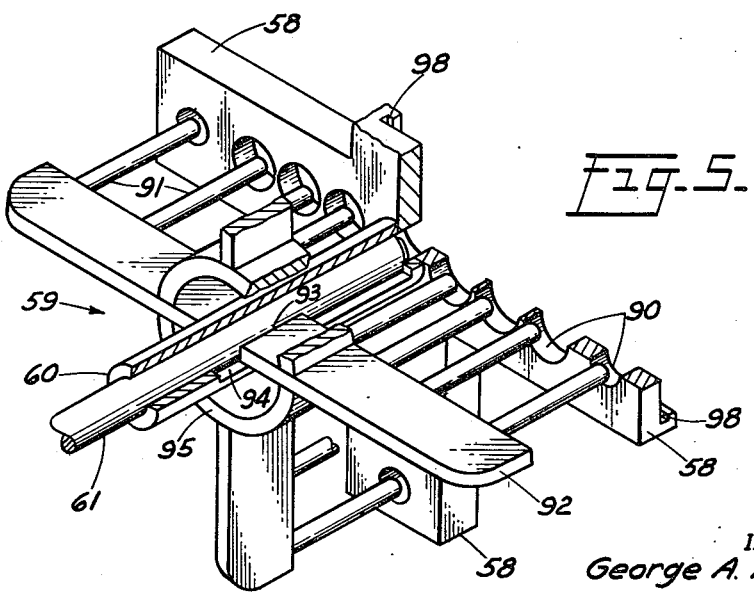
INVENTOR.
George A. Anderson
BY
Roland A. Anderson
ATTORNEY United States Patent Office 2,794,562
Patented June 4, 1957

2,794,562

FUEL ELEMENT LOADING APPARATUS FOR NEUTRONIC REACTORS

George Arthur Anderson, Chicago Heights, Ill., assignor to the United States of America as represented by the United States Atomic Energy Commission Original application November 6, 1950, Serial No. 194,331, now Patent No. 2,780,596, dated February 5, 1957. Divided and this application January 18, 1951, Serial No. 206,592

7 Claims. (Cl. 214—18)

This invention relates generally to the neutronic reactor art, and it is particularly concerned with the problem of loading and unloading fuel elements into and from neutronic reactors of the type having a plurality of parallel channels adapted to receive removable fuel elements. This application is a division of my co-pending U. S. application Serial No. 194,331 filed on November 6, 1950, now Patent No. 2,780,596 and entitled Neutronic Reactor.

As used in this specification and in the appended claims, the following terminology is defined as indicated below.

*Thermal neutrons (slow neutrons).*—Neutrons having a substantially Maxwellian number-energy distribution characteristic about an energy value equal to $kt$, where $k$ is a constant and $t$ is the temperature in degrees, Kelvin. ($kt$=0.025 electron volts at 15 degrees centigrade.)

*Fission.*—The splitting of an atomic nucleus, upon the absorption of a neutron, into a plurality of fragments of greater mass than that of an alpha particle, the splitting being accompanied by the release of energy and a plurality of neutrons.

*Fissionable.*—Having the ability to undergo fission upon the absorption of a slow neutron.

*Slow neutron absorber.*—An atomic nucleus having a slow neutron absorption cross section greater than 100 barns.

*Moderator material.*—A non-gaseous material for which the ratio $$\frac{\xi \sigma_s}{\sigma_a}$$

is greater than 10, wherein $\xi$ is the average loss in the logarithm of the energy of a fast neutron per elastic collision within the material, $\sigma_s$ is the slow neutron elastic scattering cross section per atom of the material, and $\sigma_a$ is the slow neutron absorption cross section per atom of the material.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron induced fission. Such a system has been termed a neutronic reactor or "pile." A detailed description of the theory and practice of the design, construction, and operation of reactors generally is set forth in the Science and Engineering of Nuclear Power, Addison Wesley Press, Inc., Cambridge, Massachusetts, vol. 1 (1947) and vol. 2 (1949). Reference is made particularly to chapters 4, 5, 6, 8 and 9 of vol. 1 of that publication. Any terminology not specifically defined herein is used in the sense defined on pages 112 to 115 of Goodman, vol. 1.

In one conventional design of such neutronic reactors, the central active portion takes the form of a supporting structure provided with a plurality of parallel axial fuel channels along which fuel elements containing fissionable material are removably disposed. The reactor is conventionally cooled by a gas under high pressure forced to flow axially through the active portion, either by way of the fuel channels or specially provided coolant channels. A gas tight shell, interposed between the reactor proper and the surrounding biological shielding, forms a gas tight enclosure for the coolant medium to prevent its escape into the surrounding atmosphere. The fuel element loading apparatus of the present invention is particularly adapted for use with this type of reactor.

It will be appreciated that the loading and unloading of fuel elements into and from the fuel channels of such neutronic reactors involves many difficult and inter-related problems. Since the actual loading and unloading operations are necessarily conducted within the biological shielding, the entire apparatus must be adapted to remote control from outside of the shielding. Furthermore, it is apparent that the apparatus must include very effective sealing means at the points where the apparatus necessarily passes through the shell which forms the gas tight enclosure for the coolant medium. The problem is further complicated by the fact that the apparatus must be very accurate in its capabilities to load fuel elements into a desired channel in order to avoid any dangerous malfunctioning or jamming. The mechanism must also be sufficiently rugged and positive in action to completely avoid the possibility of accidents or misoperation which would involve grave hazards in the handling of radioactive material.

The fuel loading apparatus of the present invention embraces a rotary device disposed adjacent one end of the reactor, the rotary device being remotely rotatable about the reactor axis to any desired angular loading position. The rotary device carries at least one radially extending magazine into which an elongated fuel element cartridge may be slidably charged by a remotely controlled cartridge charging mechanism disposed laterally of the reactor. Each cartridge has a plurality of transverse apertures each adapted to accommodate one fuel element. Remotely controlled axially reciprocatable fuel element charging means are associated with the rotary device for slidably transferring the fuel elements from the cartridge into the aligned fuel channels. Also associated with the rotary device is a mechanism for locking the cartridge in a fixed position in the magazine and for releasing the cartridge when empty.

Two gas tight enclosures extend in a radial direction from the gas tight shell, one of these incorporating a radially extending trackway along which a loaded cartridge may be charged into the aligned magazine, and the other incorporating a corresponding radially extending trackway along which the empty cartridge may be discharged. The first of these gas tight enclosures terminates in an axially extending section which includes another trackway adapted to accommodate an entire set of loaded cartridges. Remotely controlled means are provided for transferring loaded cartridges one at a time from this latter trackway to the intersecting radially extending trackway to be then loaded into the magazine. A pair of valves cooperate with the first mentioned gas tight enclosure and its axially extending extension to form a gas lock which may be maintained either sealed from the atmosphere and at the high pressure of the gaseous coolant or, alternatively, sealed from the gaseous coolant and at atmospheric pressure. Preferably, a plurality of magazines are provided on the rotary device at equally spaced angular positions corresponding to the angular displacement between the two radially extending gas tight enclosures, whereby an empty cartridge may be discharged from one magazine while another magazine is being charged.

The primary object of my invention therefore is to provide safe, efficient, positive-acting, and remotely controllable means for loading fuel elements into a neutronic reactor.

Another object of the present invention is to provide fuel element loading apparatus adapted to simultaneously service a plurality of fuel element channels of a neutronic reactor.

Still another object of my invention is to provide fuel element loading apparatus especially adapted to service a neutronic reactor which employs a high pressure gaseous medium as the coolant.

A further object of the invention is to provide a reactor fuel element loading apparatus which permits the entire loading operation to be completed in a relatively short time.

Other objects and advantages of the present invention will become apparent from the following detailed description, when taken in connection with the accompanying drawings, wherein, Fig. 1 is a general arrangement perspective view, partially broken away, showing the entire reactor of the present invention;

Fig. 2 is a cross sectional view of the active portion and reflector of the reactor of Fig. 1 taken along the direction of coolant flow, that is, from front to rear of Fig. 1;

Fig. 3 is a cross sectional elevation view of the active portion and reflector taken along the lines 3—3 of Fig. 2;

Fig. 4 is a cross sectional view taken along the direction of coolant flow of a single fuel element in operative association with one of the basic prism elements from which the permanent structure of the active portion is formed; and Fig. 5 is a perspective view of a detail of the fuel element charging mechanism of Fig. 1.

Referring now to the drawings, the active portion 1 and surrounding reflector 2 together form an elongated cylinder which is retained peripherally by the cylindrical shell 3, preferably formed of austenitic steel. This cylinder is retained at its forward end by an apertured steel retaining plate 4, and at its rearward end by another apertured steel retaining plate 5.

As best illustrated in Fig. 2, the active portion 1 has a generally hexagonal cross section which is built up of a large number of small hollow prisms 6, preferably in the form of hexagons, as shown in Fig. 4. The basic structural elements or prisms 6 are stacked side against side, and end against end, to form the permanent skeleton structure of the active portion, the hollow interior of the aligned prisms forming fuel channels 10 into which the fuel elements 7 can be inserted. As shown in Fig. 4, each of the outer sides of the prisms 6 are recessed, as at 8, thereby forming outwardly projecting lugs 9 at each of the corners and between each corner. When the prisms 6 are stacked side against side, the lugs 9 of adjoining prisms abut, and the adjacent recessed portions 8 form longitudinally extending passageways through which the cooling medium may flow to cool the permanent structure.

As shown in Fig. 3, different length prisms are used at the ends of adjacent channels in order to stagger the joints between prisms in the entire assembly. It will be appreciated that use of a large number of small prisms to form the permanent skeleton structure reduces the likelihood of encountering a large temperature difference within any one element and thus reduces thermal stresses.

The fuel elements 7 each comprise an outer hollow open-ended frame 11 having the same cross sectional shape as the prism 6, that is, hexagonal in the example illustrated. The frames 11 may be of a length comparable to that of the prisms 6 so that a plurality of fuel elements may be charged into a single one of the fuel element channels 10 formed by the aligned prisms 6, as best illustrated in Fig. 3. At each of the outer corners of the frame 11, there is provided an outwardly projecting shoe or runner 12 which extends the entire length of the frame 11. As shown in Fig. 4, the runners 12 cooperate with the inner corners of the associated prism 6 thereby forming longitudinally extending coolant channels 13 through which the coolant may flow to cool the inner surface of the prisms 6 and the outer surface of the frames 11.

Supported by and within the frames 11 are a number of spaced rectangular fuel plates 14 containing the fissionable material which supports the chain reaction. The fuel plates 14 are disposed in a vertical longitudinally extending plane so as to provide rectangular cooling channels through which the cooling medium may flow to cool the plates and so as to minimize any tendency the slabs may have to sag at operating temperatures.

The prisms 6 and the frames 7 are formed of a moderator material, such as beryllium, beryllium oxide, or beryllium carbide, beryllium being preferred. The runners 12 are preferably formed of graphite since graphite is a moderator material, which, in addition, has a self-lubricating characteristic which will avoid any tendency for the runners 12 to bind against the inner corners of the prisms 6. The rectangular plates 14 contain a fissionable material, such as U-233, U-235, or Pu-239, and also contain a moderator material, such as beryllium, beryllium oxide, or beryllium carbide. Preferably, the fuel plates 14 contain the fissionable material and moderator in the form of a beryllium-uranium alloy.

Filling the space between the hexagonal active portion 1 and the cylindrical retaining shell 3 is the reflector region 2 which, for the most part, is solid, and may be built up of a large number of solid blocks of a suitable moderator material, again preferably beryllium. Approximately midway radially in the reflector region, a plurality of open channels 20 are left, into which channels may be removably inserted, if desired, a plurality of rectangular conversion elements 21. Conversion elements 21 will be understood to be formed in a manner similar to that of the fuel elements 7 except that the conversion elements are formed to have a rectangular cross section, as shown. Conversion elements 21 are provided with an outer rectangular frame similar to frame 11 of the fuel elements, this outer frame supporting a plurality of spaced rectangular conversion plates corresponding to the fuel plates 14 of the fuel elements. Instead of fissionable material, however, the plates of the conversion elements 21 contain a material which, upon absorbing a neutron, is converted either to an artificially radioactive isotope which it is desired to produce in quantity or to fissionable material. Thus, it can be considered that the conversion elements 21 form a cylindrical conversion zone circumscribing the active portion and dividing the reflector region 2 into a radially inner and radially outer reflector region.

As may be seen in Fig. 3, a similar conversion zone is provided forwardly and rearwardly of the active portion. This is accomplished by charging into the fuel element channels 10 of the active portion conversion elements 21' of a special design, two of these special conversion elements 21' being located at the forward end of each fuel element channel and two being located at the rearward end of each fuel element channel. Special conversion elements 21' are identical in every respect with the fuel elements 7 except that the rectangular plates 14 are divided into two longitudinally consecutive sections 23 and 24. The section 23 is formed entirely of moderator material, again preferably beryllium, and the section 24 contains the material which it is desired to convert to fissionable material or to an artificially radioactive isotope. The two special types of conversion elements 21′ are disposed in back to back relationship, as shown in Fig. 3, to thereby form an inner reflector region, a conversion zone, and an outer reflector region at each end of the active portion.

As best illustrated in Fig. 1, the inner retaining shell 3 is supported by an outer cylindrical pressure shell 30, preferably of low alloy steel, which, in turn, is supported by the massive structure 31 of concrete which also functions as the biological radiation shield for the reactor. The steel retaining plates 4 and 5 are held together axially by tie bolts (not shown), thus confining the reactor structure axially. While both plates 4 and 5 are supported from the pressure shell 30, only the one at the rearward end is axially anchored to the pressure shell 30, in order to accommodate axial expansion of the reactor structure.

The cylindrical retaining shell 3 extends forwardly and rearwardly beyond the plates 4 and 5, respectively, and at its forward end, it is left open, whereas, at its rearward end, it is terminated in a closed dome shaped end portion 32. The pressure shell 30 extends longitudinally beyond the termination of the retaining shell 3 in both directions and is closed by dome shaped end portions 33 at both ends.

The cooling medium is preferably helium under a high pressure, such as 10 atmospheres, and it enters the pressure shell 30 by way of an inlet conduit (not shown) extending through the shielding concrete 31 and terminating in a sealed opening in the rear end portion 33 of the pressure shell 30. The high pressure helium flows forwardly through the annular space formed between the pressure shell 30 and retaining shell 3 to the point at which the retaining shell 3 terminates. At this point, it reverses and flows rearwardly past a portion of the fuel element charging mechanism and then through the various coolant channels formed in the active portion and reflector. The heated helium is removed from the reactor by means of an exit cooling conduit (not shown) which passes through the shielding concrete 31, through a seal in the rear end portion 33 of the pressure shell 30, and terminates at a sealed opening in the end portion 32 of the retaining shell 3.

In order to prevent the fuel elements and conversion elements from being blown out of the rear of the reactor by the flowing helium, a fuel retaining grid 40 is provided adjacent the retaining plate 5. Grid 40 has a series of spaced barriers 41 which pass across the apertures in retaining plate 5 which are aligned with the fuel channels and conversion channels. The position of retaining grid 40 is controlled by a grid positioning ram 42 which passes through a seal in the rear end portions 32 and 33 of the retaining shell 3 and the pressure shell 30, respectively. The ram 42 terminates in a piston 71 disposed within a cylinder 72. The position of the piston 71 and grid 40 may thus be remotely controlled by appropriate variation of the fluid pressure within the cylinder 72. As shown, the ram 42 may be surrounded by a stepped shielding plug 62 to inhibit leakage of radiation along the ram.

A series of longitudinally spaced vertically movable control rods 45 are provided in order to control the operating power level of the reactor, these elements extending downwardly through gas tight seals in the steel shells 3 and 30 into wells formed in the active portion of the reactor along a central vertical plane thereof. In order to form these control rod accommodating wells, special prisms 6 and fuel elements 7, having a central aperture therein, are provided along the central vertical plane of the reactor, as indicated in Fig. 2. The control rods 45 are conventional elements and as is well known, they contain a suitable slow neutron absorber, such as, boron or cadmium, which materials have a particularly high slow neutron absorption cross section.

Typical design specifications of a reactor constructed along the above described lines are given below:

Hexagonal fuel elements 7

| | |
|---|---|
| Number | 6 per channel in 37 channels=222. |
| Length | 8.5″. |
| Width across flats | 7.9″. |
| Thickness of fuel plates 14 | 3/16″. |
| Spacing between fuel plates | 3/16″. |
| Fuel plate material | Be—U alloy, approximately 2% U by weight, U approximately 30% U–235. |
| Material of frames 11 | Be. |
| Thickness of frames | ¼″. |
| Material of runners 12 | Graphite. |
| Thickness of coolant channel 13 | 3/16″. |

Hexagonal prisms 6

| | |
|---|---|
| Material | Be. |
| Thickness | 5/16″. |
| Thickness of recess 8 | 5/32″. |

Active portion and reflector

| | |
|---|---|
| Length of active portion | 51″. |
| Mean diameter of hexagon active portion | 55.2″. |
| Reactor length including end reflectors | 94.8″. |
| Reactor diameter including radial reflector | 98.8″. |
| Reflector material | Be. |
| Critical mass of U–235 kg | 8. |
| Actual mass of U–235 kg | 11. |

For the purposes of definiteness and concreteness, I have set forth above in considerable detail one example of a reactor of the type with which the fuel loading apparatus of the present invention finds its greatest utility. As the description of the fuel loading apparatus proceeds, however, it will become apparent that the invention has many aspects of general application to the problem of loading discrete fuel elements into a reactor, irrespective of any particular reactor design.

The fuel loading apparatus for the reactor may be considered as consisting of a cartridge positioning mechanism, indicated generally at 50, a cartridge loading mechanism, indicated generally at 51, and a fuel element charging mechanism indicated generally at 52. Briefly, the function of the cartridge positioning mechanism 50 is to transfer loaded fuel cartridges 53 from a longitudinally extending track-way 54, upon which the cartridges slide, to a perpendicular track-way 55, the cartridges being so transferred one at a time by suitable linear movement of a cartridge positioning ram 56. The transferred cartridge 53 is then moved along the track-way 55 by suitable linear movement of a cartridge loading ram 57 of the cartridge loading mechanism 51. The cartridge loading mechanism 51 serves to move the cartridge 53 along the track-way 55, and, at the termination of the trackway, to transfer the cartridge to one of four magazines 58, which magazines each form an index arm of a rotary device, indicated generally at 59, which device forms a part of the fuel element charging mechanism 52. The function of the fuel element charging mechanism is to rotate the loaded magazine 58 to an appropriate position by suitable rotation of a sleeve shaft 60, and this having been accomplished, to transfer the fuel elements and/or conversion elements from the cartridge 53 into the aligned channels of the reactor, this latter operation being effected by suitable reciprocation of a fuel element charging ram 61. The rotatable sleeve shaft 60 and the reciprocable fuel element charging ram 61 are concentric with the reactor and pass first through the dome shaped forward end portion 33 of the steel pressure shell 30 in sealed relationship therewith, and thereafter through a stepped shielding plug 62 in the shielding concrete 31.

The track-ways 54 and 55 are contained within a gas tight enclosure 70 which extends laterally from a point adjacent the forward end of the reactor. At the cartridge loading mechanism 51, this enclosure makes a 90° turn and then extends in a longitudinal direction to a point some distance beyond the rearward end of track-way 54. The cartridge loading ram 57 of the cartridge loading mechanism 51 extends through a suitable seal in the enclosure 70, and the cartridge positioning ram 56 of the cartridge positioning mechanism 50 also extends through a suitable seal in the enclosure 70. The reactor end of the enclosure 70 extends through a sealed aperture in the pressure shell 30 and terminates at a sealed opening in the retaining shell 3.

The reciprocable rams 56, 57, and 61 are linearly actuable in any convenient manner externally to the shielding 31. These rams are illustrated as being remotely operable pneumatically or hydraulically by means of pistons 71 disposed within hydraulic cylinders 72. The rotatable sleeve shaft 60 is driven by a motor 73 connected through a gear box 74 to drive pinion gear 75, the pinion gear 75 engaging a gear 76 which is connected to actuate the sleeve shaft 60.

A valve 77 is interposed in the gas tight enclosure 70 so that that portion of the enclosure beyond the valve may be isolated from the remainder of the enclosure and from the high pressure helium system of the reactor proper. A second valve 78 is provided in the enclosure 70 whereby the enclosure may be opened to the atmosphere or sealed from the atmosphere, as desired, the valve 78 being large enough to permit manual insertion of loaded cartridges 53 into the enclosure 70 and onto the track-way 54. It will thus be apparent that that portion of the enclosure 70 beyond the valve 77 serves as a gas lock which may either be isolated from the high pressure helium system of the reactor proper and in communication with the atmosphere, or alternatively, may be sealed from the atmosphere and made a part of the high pressure helium system, depending upon the respective positions of the valves 77 and 78.

Also included in the enclosure 70, to the reactor side of the valve 77, is a vertically movable shielding block 80 which may be remotely actuated in any convenient way, again illustrated as by means of a ram 81 terminating in a piston 71 disposed within a hydraulic cylinder 72. The purpose of the shielding block 80, of course, is to prevent radiation streaming along the laterally extending portion of the enclosure 70. The shielding block 80 is in its extreme upper or radiation sealing position during the normal operation of the reactor, and is only lowered, as shown, during the operation of the loading apparatus.

The rotary device 59 of the fuel element charging mechanism 52 is shown in considerable detail in Fig. 5. As there shown, the magazines or index arms 58 are four in number arranged ninety degrees apart, and they are carried by and rotate with the sleeve shaft 60, so that the loaded magazine may be positioned at any angular loading position desired. Each of the arms 58 is provided with a series of radially spaced holes 90 extending therethrough. Each of the holes 90 has associated therewith, in aligned relationship, a finger or plunger 91. Plungers 91 extend from, and are linearly movable with, four radial plunger arms 92, also arranged at 90 degree intervals around the rotary device 59. Two of the plunger arms 92 are attached directly to the fuel element charging ram 61, as indicated at 93, these two arms extending through axial slots 94 in the sleeve shaft 60. The other two plunger arms are attached to a circular yoke member 95, which, in turn, is attached to the other two plunger arms. By virtue of the above described construction of the rotary device 59, it will be apparent that rotation of sleeve shaft 60 effects rotation of the entire rotary device 59, including plunger arms 92 and index arms 58, and linear movement of the fuel element charging ram 61 effects a corresponding linear movement of plunger arms 92 and plungers 91 relative to the index arms 58.

The cartridges 53 comprise essentially solid blocks having a series of spaced apertures 96 therein, the innermost group of these apertures being of a shape to accommodate hexagonal fuel elements 7, and the outermost one of these apertures being of a shape to accommodate a conversion element 21. The cartridges 53 have on both edges of their upper and lower surfaces a plurality of pads 97. These pads may fit into guide rails (not shown) which may be provided along the track-way 55, if desired, to insure proper alignment of the cartridges. As best shown in Fig. 5, the magazines or index arms 58 are provided with upper and lower slots 98 into which the upper and lower pads at one edge of the cartridges 53 slide when the cartridges are transferred from the track-way 55 to the index arms 58. The cartridges 53 are somewhat wider than the length of the fuel elements and conversion elements, as may be seen in Fig. 1.

When it is desired to reload a particular channel of the reactor, or a particular group of radially aligned channels, the reactor is shut down, or at least its power level is reduced to a low value by suitable insertion of control rods 45. The valve 77 is then checked to insure that it is closed, isolating the portion of gas tight enclosure 70 beyond this valve from the reactor proper, and forming the above-described gas lock. The gas lock is then preferably purged of radioactive helium and filled with air at atmospheric pressure, after which the valve 78 is opened. A sufficient number of cartridges 53 to load an entire channel are then manually inserted within the gas lock and onto the track-way 54. After each cartridge 53 is inserted, the cartridge positioning mechanism 50 is actuated to move the inserted cartridge along the track-way a sufficient distance to make room for the next cartridge. The ram 56 of the cartridge positioning mechanism 50 is then withdrawn to permit the insertion of the next cartridge.

It will be understood that a large number of sets of identical cartridges 53 are available to the operator, these sets differing from each other in the positioning and spacing of the slots 96. That is, for each of the various predetermined angular loading positions of the rotary device 59, there is an associated set of cartridges 53, the spacing and position of the slots 96 of which correspond to the spacing and position of the radially aligned reactor channels at that particular angular loading position. At some angular loading positions, only one of the channels will be able to be serviced at one time, whereas, at some other angular loading positions, all of the channels are aligned and are able to be serviced simultaneously. It will be understood that the operator has chosen a set of cartridges 53 which are appropriate for the particular channel or aligned channels which it is desired to service, and that fuel elements 7 and/or conversion elements 21 had previously been inserted into the appropriate one or ones of the slots 96 of the cartridges 53.

The track-way 54 having been thus loaded with a particular set of cartridges 53, the valve 78 is closed and the valve 77 is opened and the shielding block 80 is lowered. The first loaded cartridge is then transferred to the track-way 55 by suitable manipulation of the cartridge positioning ram 56. This cartridge 53 is then moved along the track-way 55 and transferred to the aligned magazine or index arm 58 by suitable manipulation of the cartridge loading ram 57. The plunger arms 92 and extending plungers 91 are then moved inwardly a short distance, say about two inches, to an "intermediate" position by a corresponding movement of the fuel element charging ram 61. The effect of moving the charging ram 61 to its "intermediate" position is to permit the plungers 91 to move part way into the slots 96 of the cartridges 53 to thereby lock the cartridges at a fixed radial position with respect to the rotary device 59 and the reactor as a whole. For this purpose, it will be understood that one of the slots 96 of all the cartridges terminates at the end adjacent the plungers in a section which corresponds closely to the diameter of the associated plunger, so that a close fit is provided between the associated plunger and this section of this slot.

The cartridge 53 having been thus locked in position in the magazine 58, the rotary device 59 is rotated by means of sleeve shaft 60 until the contained fuel and/or conversion elements are aligned with the channels which are to be serviced. The charging ram 61 is then moved to its innermost position, thereby transferring the elements into the aligned channels of the reactor and ejecting the spent elements from the rear of the channels. As indicated in Figure 1, this transfer is effected by the charging ram 61, itself, pushing against that fuel element 7 which is disposed in the innermost slot 96 of cartridge 53, the inner three plungers 91 pushing against the three fuel elements 7 which are disposed in the three intermediate slots 96, and the outermost plunger 91 pushing against the conversion element 21 which is disposed in the outermost slot 96. In order that the spent elements may be so ejected, the retaining grid 40 had previously been withdrawn by retraction of the ram 42. The ejected spent element falls through a fuel element discharge opening (not shown) in the rear of the reactor and is removed through a discharge channel for chemical reprocessing.

Sleeve shaft 60 is then rotated until the magazine or index arm 58 containing the empty cartridge projects vertically downwardly in alignment with an opening 99 cut in the forward extension of the cylindrical retaining shell 3. Opening 99 provides access to a discharge trackway 55' and a gas tight enclosure, similar to enclosure 70, through which the empty cartridge may be discharged. In order to prevent damage to the cartridge a cartridge unloading mechanism (not shown) similar to the cartridge loading mechanism 51 may be provided. The empty cartridge is released from the downwardly projecting index arm 58 by linearly withdrawing the charging ram 61 to its outermost position. It will be apparent that in this angular position of the rotary device 59, another index arm 58 is aligned with track-way 55, and this index arm may be loaded with another loaded cartridge while the empty cartridge is being discharged through the opening 99, thus saving time in the loading operation.

The thus described loading process is repeated until all of the elements of the radially aligned channels being serviced have been replaced by new elements, that is, until all of the loaded cartridges 53 have been removed from the track-way 54 and discharged as empty cartridges through the opening 99.

If it is then desired to service another radially aligned group of channels associated with a different angular loading position of the rotary device 59, the entire above described process is repeated utilizing a different set of cartridges 53 corresponding to the new angular loading position. When all of the channels which require reloading have been thus serviced, the retaining grid 40 is again forced up against retaining plate 5 by actuation of the ram 42, the shielding block 80 is returned to its uppermost position and the valve 77 is closed. The reactor may then be returned to its operating power level by withdrawal of control rods 45.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. Fuel element loading apparatus adapted for use with a neutronic reactor of the type having a plurality of parallel axially extending fuel channels arranged about the reactor axis, comprising a rotary device disposed adjacent the inlet end of the fuel channels and pivotally mounted for rotation about an axis coincident with the axis of the reactor, said rotary device having a radially extending magazine adapted to receive a plurality of radially spaced fuel elements, a radially extending plunger arm axially spaced from and aligned with said magazine, said plunger arm being slidably mounted on said rotary device for axial movement relative thereto, said arm having a plurality of radially spaced axially extending fingers aligned with said fuel elements, remotely controllable means for rotating said rotary device to any desired angular charging position, and remotely controllable means for axially displacing said plunger arm.

2. Fuel element loading apparatus adapted for use with a neutronic reactor of the type having a plurality of parallel axially extending fuel channels arranged about the reactor axis, comprising a rotary device disposed adjacent the inlet end of the fuel channels and pivotally mounted for rotation about an axis coincident with the axis of the reactor, said rotary device having a radially extending magazine, an elongated cartridge adapted to be received by said magazine, said cartridge having a plurality of spaced apertures extending transversely therethrough and adapted to accommodate associated fuel elements, a radially extending plunger arm axially spaced from and aligned with said magazine, said plunger arm being slidably mounted on said rotary device for axial movement relative thereto, said arm having a plurality of radially spaced axially extending fingers aligned with the apertures of said cartridge, remotely controllable means for rotating said rotary device to any desired angular charging position, and remotely controllable means for axially displacing said plunger arm.

3. Fuel element loading apparatus adapted for use with a neutronic reactor of the type having a plurality of parallel axially extending fuel channels arranged about the reactor axis, comprising a rotary device disposed adjacent the inlet end of the fuel channels and pivotally mounted for rotation about an axis coincident with the axis of the reactor, said rotary device having a radially extending magazine, an elongated cartridge adapted to be received by said magazine, said cartridge having a plurality of spaced apertures extending transversely therethrough and adapted to accommodate associated fuel elements, a radially extending plunger arm axially spaced from and aligned with said magazine, said plunger arm being slidably mounted on said rotary device for axial movement relative thereto, said arm having a plurality of radially spaced axially extending fingers aligned with the apertures of said cartridge, at least one of the apertures of said cartridges having at the plunger arm side thereof a reduced portion barely larger than the associated finger whereby said cartridge can be locked in position in the magazine, remotely controllable means for rotating said rotary device to any desired angular charging position, and remotely controllable means for axially displacing said plunger arm.

4. Fuel element loading apparatus adapted for use with a neutronic reactor of the type having a plurality of parallel axially extending fuel channels arranged about the reactor axis, comprising a rotary device disposed adjacent the inlet end of the fuel channels and pivotally mounted for rotation about an axis coincident with the axis of the reactor, said rotary device having a radially extending magazine, an elongated cartridge adapted to be received by said magazine, cartridge loading mechanism including a track-way extending laterally from the reactor, a plunger laterally reciprocatable along said track-way, remotely controllable means for positioning said cartridge on said track-way to the reactor side of said plunger, and remotely controllable means for actuating said plunger to thereby slide said cartridge along said track-way and onto said magazine, said cartridge having a plurality of spaced apertures extending transversely therethrough and adapted to accommodate associated fuel elements, a radially extending plunger arm axially spaced from and aligned with said magazine, said plunger arm being slidably mounted on said rotary device for axial movement relative thereto, said arm having a plurality of radially spaced axially extending fingers aligned with the apertures of said cartridge, remotely controllable means for rotating said rotary device to any desired angular fuel element charging position, and remotely controllable means for axially displacing said plunger arm.

5. Fuel element loading apparatus adapted for use with a neutronic reactor of the type having a plurality of parallel axially extending fuel channels arranged about the reactor axis, comprising a rotary device disposed adjacent the inlet end of the fuel channels and pivotally mounted for rotation about an axis coincident with the axis of the reactor, said rotary device having a radially extending magazine, an elongated cartridge adapted to be received by said magazine, a cartridge charging trackway extending laterally from the reactor, a cartridge charging plunger laterally reciprocatable along said trackway, cartridge positioning mechanism for positioning a cartridge on said trackway to the reactor side of said plunger, said mechanism including an axially extending cartridge positioning trackway terminating adjacent said cartridge charging trackway and being adapted to receive a plurality of cartridges, a cartridge positioning plunger reciprocatable along said cartridge positioning trackway, and means for actuating said cartridge positioning plunger to thereby slide a cartridge along said cartridge positioning trackway and on to said cartridge charging trackway, remotely controllable means for actuating said cartridge charging plunger to thereby slide said cartridge along said cartridge charging track-way and on to said magazine, said cartridge having a plurality of spaced apertures extending transversely therethrough and adapted to accommodate associated fuel elements, a radially extending plunger arm axially spaced from and aligned with said magazine, said plunger arm being slidably mounted on said rotary device for axial movement relative thereto, said arm having a plurality of radially spaced axially extending fingers aligned with the apertures of said cartridge, remotely controllable means for rotating said rotary device to any desired angular charging position, and remotely controllable means for axially displacing said plunger arm.

6. Fuel element loading apparatus adapted for use with a neutronic reactor of the type having a plurality of parallel axially extending fuel channels arranged about the reactor axis and a gas tight shell surrounding the reactor and forming an enclosure for a high pressure gaseous coolant, comprising a rotary device disposed adjacent the inlet end of the fuel channels and pivotally mounted for rotation about an axis coincident with the axis of the reactor, said rotary device having a radially extending magazine, an elongated cartridge adapted to be received by said magazine, a cartridge charging trackway extending laterally from the reactor, a cartridge charging plunger laterally reciprocable along said trackway, cartridge positioning mechanism for positioning a cartridge on said track-way to the reactor side of said plunger, said mechanism including an axially extending cartridge positioning track-way terminating adjacent said cartridge charging track-way and being adapted to receive a plurality of cartridges, a cartridge positioning plunger reciprocatable along said cartridge positioning track-way, and means for actuating said cartridge positioning plunger to thereby slide a cartridge along said cartridge positioning track-way and on to said cartridge charging track-way, remotely controllable means for actuating said cartridge charging plunger to thereby slide said cartridge along said cartridge charging track-way and on to said magazine, means forming a gas lock around said cartridge positioning track-way, said last named means including a gas tight enclosure surrounding both of said track-ways and communicating with the interior of said gas tight shell and two valves associated with said enclosure, said cartridge having a plurality of spaced apertures extending transversely therethrough and adapted to accommodate associated fuel elements, a radially extending plunger arm axially spaced from and aligned with said magazine, said plunger arm being slidably mounted on said rotary device for axial movement relative thereto, said arm having a plurality of radially spaced axially extending fingers aligned with the apertures of said cartridge, remotely controllable means for rotating said rotary device to any desired angular charging position, and remotely controllable means for axially displacing said plunger arm.

7. Fuel element loading apparatus adapted for use with a neutronic reactor of the type having a plurality of parallel axially extending fuel channels arranged about the reactor axis, comprising a rotary device disposed adjacent the inlet end of the fuel channels and pivotally mounted for rotation about an axis coincident with the axis of the reactor, said rotary device having a plurality of equally angularly spaced radially extending magazines, an elongated cartridge adapted to be received by said magazines, said cartridge having a plurality of spaced apertures extending transversely therethrough and adapted to accommodate associated fuel elements, a plurality of radially extending plunger arms axially spaced from and aligned with respective magazines, said plunger arms being slidably mounted on said rotary device for axial movement relative thereto, said arms each having a plurality of radially spaced axially extending fingers aligned with said fuel elements, remotely controllable means for rotating said rotary device to any desired angular fuel element charging position, remotely controllable means for axially displacing said plunger arm, means forming a cartridge charging passageway extending radially from said rotary device, and means forming a cartridge discharging passageway extending radially from said rotary device, both of said passageways lying in the plane of said magazines, the angle between said passageways being equal to the angle between successive ones of said magazines.

References Cited in the file of this patent

UNITED STATES PATENTS

| | | |
|---|---|---|
| 477,764 | Mercer | June 28, 1892 |
| 704,286 | Allis | July 8, 1902 |